(12) United States Patent
Motteram et al.

(10) Patent No.: US 7,327,262 B2
(45) Date of Patent: Feb. 5, 2008

(54) SYSTEM AND METHOD FOR ELECTRONIC ARTICLE SURVEILLANCE

(75) Inventors: Bryan David Motteram, Sheffield (GB); Paul Eric Vallender, Leeds (GB); Darren John Marsden, Chorley (GB)

(73) Assignee: Mantic Point Solutions Limited, Leeds (GB)

( * ) Notice: Subject to any disclaimer, the term of this patent is extended or adjusted under 35 U.S.C. 154(b) by 269 days.

(21) Appl. No.: 11/247,597

(22) Filed: Oct. 12, 2005

(65) Prior Publication Data

US 2007/0222595 A1   Sep. 27, 2007

(51) Int. Cl.
*G08B 13/14* (2006.01)

(52) U.S. Cl. .............. 340/572.1; 340/825.49; 235/385

(58) Field of Classification Search .. 340/572.1–572.9, 340/825.36, 10.1, 825.49, 505, 539.13; 705/5; 235/385, 462.22

See application file for complete search history.

(56) References Cited

U.S. PATENT DOCUMENTS

| | | | |
|---|---|---|---|
| 5,519,403 A | 5/1996 | Bickley et al. | 342/352 |
| 5,835,377 A | 11/1998 | Bush | 364/468.05 |
| 5,914,671 A * | 6/1999 | Tuttle | 340/10.42 |
| 6,338,041 B1 | 1/2002 | Kawamata | 705/5 |
| 2001/0029425 A1 | 10/2001 | Myr | 701/200 |
| 2002/0134836 A1 | 9/2002 | Cash et al. | 235/385 |
| 2004/0124982 A1* | 7/2004 | Kovach | 340/572.1 |
| 2005/0146417 A1* | 7/2005 | Sweatte | 340/5.2 |
| 2007/0009138 A1* | 1/2007 | Ishikawa | 382/111 |

FOREIGN PATENT DOCUMENTS

| | | |
|---|---|---|
| WO | WO 96/08760 | 3/1996 |
| WO | WO 96/16387 | 5/1996 |
| WO | WO 98/39749 | 9/1998 |

(Continued)

OTHER PUBLICATIONS

International Search Report. Application No. GB 0501161 Dated Mar. 21, 2005.

(Continued)

*Primary Examiner*—Phung T. Nguyen
(74) *Attorney, Agent, or Firm*—Pearl Cohen Zedek Latzer LLP (57) ABSTRACT

There is disclosed a system and method for electronic article surveillance wherein the time taken for articles to move from a starting point to a destination point by way of a series of zones is monitored in real time, taking into account bottleneck and non-bottleneck zones. A set of simple rules is applied so as to give estimated times of arrival for any given article. When it is calculated that an article will arrive after a predetermined critical time, an alert is triggered and remedial action may be taken. Various attributes of each zone may additionally be monitored, for example the number of articles in the zone or the temperature of the zone. The system and method may be applied to passengers in an airport, a warehouse or distribution center, or any other application where articles are being moved from one place to another.

36 Claims, 4 Drawing Sheets

FOREIGN PATENT DOCUMENTS

| | | |
|---|---|---|
| WO | WO 00/45324 | 8/2000 |
| WO | WO 01/67127 | 9/2001 |
| WO | WO 01/92910 | 12/2001 |
| WO | WO 02/082395 | 10/2002 |
| WO | WO 02/013384 | 12/2002 |
| WO | WO 03/065257 | 8/2003 |
| WO | WO 03/075216 | 9/2003 |

OTHER PUBLICATIONS

International Search Report. Application No. GB 0401345 Dated Oct. 27, 2004.

International Search Report Application No. PCT/US01/07098 Dated Jun. 11, 2003.

* cited by examiner

| Zone ID | Description | Bottleneck? | Departure Gate? |
|---|---|---|---|
| 1 | Outside terminal building | N | N |
| 2 | Check-in | N | N |
| 3 | Shops – Landside | N | N |
| 4 | Café – Landside | N | N |
| 5 | Security | Y | N |
| ... | ... | ... | ... |
| 8 | Bar – Airside | N | N |
| ... | ... | ... | ... |
| 10 | Gate 1 | N | Y |
| 11 | Gate 2 | N | Y |
| ... | ... | ... | ... |
| 17 | Lounge | N | N |

Figure 3:

| Reader ID | Zone 1 ID | Zone 2 ID | Relative Reader Position |
|---|---|---|---|
| 001 | 1 | 2 | 1 |
| 002 | 1 | 2 | 2 |
| 003 | 2 | 3 | 1 |
| 004 | 2 | 3 | 2 |
| 005 | 3 | 4 | 1 |
| 006 | 3 | 4 | 2 |
| 007 | 3 | 5 | 1 |
| 008 | 3 | 5 | 2 |
| ... | ... | ... | ... |

Figure 4:

| Start Zone ID | End Zone ID | Calendar ID | Time (minutes) |
|---|---|---|---|
| 2 | 3 | 1 | 3 |
| 3 | 5 | 1 | 3 |
| 3 | 4 | 1 | 2 |
| 5 | 17 | 1 | 10 |
| 9 | 17 | 1 | 5 |
| 6 | 17 | 1 | 4 |
| 7 | 17 | 1 | 4 |
| 8 | 17 | 1 | 4 |
| 17 | 10 | 1 | 5 |
| 17 | 11 | 1 | 5 |
| ... | ... | ... | ... |

| Reader ID | Zone 1 | Zone 2 |
|---|---|---|
| 001 | A | B |
| 002 | B | C |
| 003 | B | D |
| 004 | C | D |

Figure 7

| Reader ID | Zone 1 | Zone 2 |
|---|---|---|
| ... | ... | ... |
| 005 | E | F |
| 006 | E | G |
| 007 | F | G |
| 008 | F | H |
| 009 | G | I |

Figure 8

SYSTEM AND METHOD FOR ELECTRONIC ARTICLE SURVEILLANCE

FIELD OF THE INVENTION

The present invention relates to the monitoring of the movement of objects including persons.

BACKGROUND OF THE INVENTION

It is known to monitor the movement of an object including a person by means of a tag attached to the object, and a plurality of tag readers located in an area to be monitored. Such areas include the passenger portions of an airport environment, baggage handling areas for passengers, the floor area and conveyor systems in a warehouse, package handling for mail distribution, retail premises and other environments.

After the weather, the second largest delay for airlines is passengers arriving late at the departure gate. With no visibility into the whereabouts of passengers after they have checked-in, some people have proposed attaching Radio Frequency Identification (RFID) tags to boarding cards or frequent flyer cards and using a network of RFID readers around the airport to track a passenger's location. Most prior art systems use RFID readers as a beacon, whereby passengers is detected when they are in the proximity of the reader, but when they are out of range, they are "lost" to the system.

Some have suggested an enhancement to this, using zones to track passengers, where a reader is placed at every entry and exit point to a zone, to know accurately which area the passenger is in. However, none of the prior art systems based on zones appear fully to have explored the advantages that are made possible by such a system.

Some have suggested that knowing the departure time and gate of a flight, and knowing where a passenger is now, and how long it takes to get from that passenger's current location to the gate, you can warn passengers at risk of being late.

However, no one has explained in detail how it is possible to create timing information effectively in a large airport, and there is no consideration of other "real world" factors that effect any time of arrival, specifically queue time in bottleneck areas like security.

A summary of relevant background art is set out below.

WO 2003/065257 (KNIGHT) discloses a passenger check-in and monitoring system that uses a memory device in the form of an electronic radio frequency identification tag (RFID tag) containing passenger and travel information which is linked to a passenger travel ticket, passenger boarding card of other personal identity item and passenger luggage including hand luggage. A plurality of antennas is disposed about the airport to detect the movement of RFID tags around the airport complex. KNIGHT further discloses that the airport may be compartmentalised into zones, with antennas located at the entry and exit points of zones enabling airport users to be traced to specific areas within the airport. Problems can arise, however, when an antenna located at the entry and exit points of a zone fails to detect the passage of a tagged object into or out of a zone and, particularly in applications with a significant number of interlinked zones, the system can become confused.

U.S. Pat. No. 6,338,041 (FUJITSU) discloses a passenger management system having a boarding processing system with a plurality of tag readers and speakers connected to an automatic broadcasting unit each located in a plurality of areas into which a premises of an airport is divided. If there is found a remarked boarding card with which the check-in has been completed at a checking counter but boarding has not yet been confirmed, the tag readers ale successively actuated from a gate counter and an area among said plurality of areas in which said remarked boarding card is present is determined based on the signal received by said tag readers Such systems have the disadvantage that passengers are identified as late only when they fail to turn up at the boarding gate, when it may be too late to locate them in time for the scheduled departure.

WO 03/075216 (INTERNATIONAL AIRTAG) discloses an airport communication system having a tag affixed by a clip to each passenger en route between check-in and boarding. Each tag transmits an identifier on a particular RF channel with a short range and the location of a transponder which receives the transmission indicates passenger location. A server correlates tag and passenger and identifies and generates alerts if alert conditions are met such as excessive distance from a boarding gate at a particular time.

WO 01/92910 (WALKER) discloses a method and apparatus for determining the location of a plurality of users. It is disclosed to use radio frequency communications and that the tag could have an LCD display screen and that the tag could be used to remind passengers that a flight has started boarding or that boarding is about to close, before the passenger is late US 2002/0134836 (CASH) discloses an event driven baggage management system whereby readers are used to detect and monitor the location of tags attached to baggage as the baggage moves from the point at which the traveller drops off the baggage to the point at which the passenger picks up the baggage at a destination location. The system predicts a time (t1) for the object to travel from a first reader to a second reader. If the object is not detected by the second tag reader at time t1 following detection by the first reader, the location status of the tag is deemed uncertain. The document further discloses the sending of notification to a traveller or the carrier when specified baggage events occur.

With reference now to retail supply chains, it is becoming common practice to attach RFID tags to pallets and cases so as to be able to track goods through the supply chain. Today, tracking is at a high level of granularity (e.g. with readers at the doors into and out of a warehouse, so it is possible to know whether or not products are in the warehouse, but not exactly where those goods are in the warehouse).

With the drive towards continuous flow distribution, orders have to be ready to ship at a specific time. With large warehouses/distribution centres preparing orders through a variety of mechanisms (e.g. one order could use a mixture of full-pallet picking using fork-lift trucks, full-case picking using conveyor and sorting systems, and cross-docking of goods), there is a lot of complexity and opportunity for things to go wrong. Often when a problem occurs, the warehouse supervisor only realises when a product is not at the dock door on time, and this is too late to take collective action. So, there is a real advantage in knowing where each item is as it moves towards the dock door, and having the ability to predict problems at the earliest opportunity.

A summary of relevant background art is set out below.

WO 02/082395 (US POSTAL SERVICE) discloses a method and apparatus for tracking and locating a moveable article through geographical areas using electromagnetic signals. An article contains a tag operating as transmitter and receiver. Tag readers in the defined geographical area interact with the tags to track the article An area may be polled by the readers to identify the location of specific objects, for example objects that should be on a departing mail truck.

WO 00/45324 (SENSORMATIC) discloses a method for production and operations management using a read/write RFID tag associated with a product to be processed whereby information may be written to the tag following each of one or more processes performed on the product including a manufacturing process, an inspection process, a shipping process, a warehousing process and a retailing process. The document discloses verifying if the performance is close to the expected or perceived performance by determining a difference between actual performance and programmed or forecast performance of the effective utilization ratio in a warehouse.

WO 01/067127 (ECARGOSERVICE) discloses a method and apparatus that automatically tracks monitors and schedules the shipping of objects through carriers such as delivery trucks, ships or planes. A tracking tag is attached to each shipped object and may incorporate GPS, cellular technology and barcoding as tracking techniques, and sensors such as temperature pressure and noise. Logic rules are applied to tracking information to include or exclude the information. For example the information may be checked against time to see if time between locations is plausible. Periodic checks are also made to see if the object is being transported according to schedule.

SUMMARY OF THE INVENTION

In a first aspect of the present invention there is provided a system for monitoring the movement of entities from a first location to a second location via a plurality of zones, the system including:

means for detecting passage of an entity from one zone to another zone;

data storage means for storing, in real-time, data comprising an identity of each zone a particular entity has occupied, a sequence in which each zone has been occupied, and a time at which the entity moves from one zone to another;

means for calculating and storing an average transit time of entities through bottleneck zones based on the stored data;

means for inputting and storing an average transit time of entities through non-bottleneck zones;

means for calculating, based on the stored data, an estimated completion time of an entity, which is the time to travel between the zone in which an entity is located and the second location of the entity;

means for calculating, based on said estimated completion time, an estimated time of arrival of an entity at the second location of the entity;

means for periodically recalculating the estimated completion time of an entity; and means for providing an alert in the event an entity is predicted to arrive at the second location of the entity beyond a predetermined critical arrival time of the entity.

In a second aspect of the present invention there is provided a method for monitoring the movement of entities from a first location to a second location via a plurality of zones, the method including the steps of:

detecting passage of an entity from one zone to another zone;

storing, in real-time, data comprising an identity of each zone a particular entity has occupied, a sequence in which each zone has been occupied, and a time at which the entity moves from one zone to another;

calculating and storing an average transit time of entities through bottleneck zones based on the stored data;

inputting and storing an average transit time of entities through non-bottleneck zones;

calculating, based on the stored data, an estimated completion time of an entity, which is the time to travel between the zone in which an entity is located and the second location of the entity;

calculating, based on said estimated completion time, an estimated time of arrival of an entity at the second location of the entity;

periodically recalculating the estimated completion time of an entity;

and providing an alert in the event an entity is predicted to arrive at the second location of the entity beyond a predetermined critical arrival time of the entity For the purposes of the present invention, objects whose movement is to be monitored are fitted with a tag, the tag having the ability to provide a unique radio frequency or other identification signal which may be detected by a tag reader. An area within which the movement of an object is to be monitored is divided into a plurality of zones.

The progress of tag movement between the zones defined within the area is monitored by the system, which is capable of generating an alert when the position of an entity has not progressed as required to arrive at the second location by a predetermined time. In addition the system uses its intelligence to predict which entities are likely to fail to arrive on time, and also the relevant rate determining step or steps, allowing preventative or remedial measures to be taken.

In addition to providing a predictive analysis of arrival time of the entities at the second location so as to allow targeted intervention where necessary, embodiments of the present invention can measure particular attributes of each zone (e.g. number of entities in the zone, average speed of passage of entities through the zone, temperature within the zone, movement behaviour of entities within the zone etc.). Analysis of these measured attributes in combination with predetermined rules can be used to trigger various alerts.

For example, in an airport it may be necessary to limit numbers of people in certain areas for reasons of health and safety. The present invention may be used to monitor the number of tags in any given zone, and to trigger an alert if the number of detected tags in the zone exceeds, say, 90% of a predetermined maximum. The system may then send a message (e.g. a pager message or text message) to a security guard identifying the zone in question and instructing the guard to prevent further people from entering the zone.

In a distribution centre, where only certain quantities of a product are allowed in a particular area at any one time (for example flammable or explosive products), the system could be used to send an alert to a supervisor when a given threshold is reached.

In a chilled food distribution centre, the temperature in any given zone can be monitored and the amount of time each product spends in the zone can also be tracked. If the temperature goes outside a predetermined tolerance or products spend too long in a zone with too high a temperature, an alert may be triggered to warn a supervisor. This is much cheaper than providing individual tags each of which includes a temperature sensor Particularly preferred embodiments of the invention have the advantage that uncertainties in determining the location of a tagged object due to failure of a tag reader to detect a tagged object passing between zones can be resolved according to a set of error-correction rules stored in the system. This may be particularly important in applications where a plurality of routes exist between a first zone and a second zone.

Rather than simply using standard times from each zone or zone interface to any given destination, the present invention makes use of real-time data gathered from the bottleneck zones. This is because bottleneck zones are zones where environmental factors (e.g. a particularly long queue to pass through airport security, or security staff or security staff shortages, or a fork-lift truck breaking down in a warehouse etc.) can significantly increase the expected time to pass through a bottleneck zone. By tracking the time an entity takes to pass through a bottleneck zone, it is possible to effect real-time updates of expected passage times and to factor these into the system as real-time, or substantially real-time, variables in combination with the standard times for non-bottleneck zones.

It is also desirable to provide a way of efficiently capturing standard travel times between different zones. In large airports or distribution centres, measuring the travel time between every single zone and every single destination is a time-consuming and computationally expensive process. The system of the present invention may make use of a relatively small number of rules that define which timing points need to be recorded for any given zone:

a) If a zone has a bottleneck between it and the destination point, then the time to travel from the zone to the bottleneck is recorded.
b) For all other zones beyond a bottleneck, the time taken to travel from the zone to the destination point is recorded.
c) Bottleneck zones are treated in the same way. Thus, if a there is a further bottleneck zone between a given bottleneck zone and the destination point, then the time to travel from the given bottleneck zone to the further bottleneck zone is recorded. If there are no further bottleneck zones between the given bottleneck zone and the destination point, then the time taken to travel to the destination point is recorded.

By tracking the actual time taken to move between these timing points and capturing the times in a reporting database, it is possible continually to refine the standard times based on observed behaviour.

Once the zone in which an object is located has been identified, it may be desirable to determine the location of the object within that zone more precisely. For this purpose a portable detector may be provided that enables an operator manually to locate the object. In the particular case that the object is a per son, the system may also provide a targeted alert to the person either by means of an audible broadcast system, or via telecommunications means such as a short message, email or telephone call to a mobile telephone associated with the person.

As well as pro-actively alerting operators when a problem occurs, the system of the present invention may also provide a centralised view of operations for supervisors such as warehouse supervisors, airport duty managers and the like.

To avoid information overload, the system may make use of the concept of an agent. An agent is an automated process that looks after a flight or a shipment or the like—it is equivalent to having a per son who is solely responsible for that flight or shipment The agent may use a simple red, amber, green traffic lighting system to indicate the status of the flight or shipment it is controlling. In this way, the operator—who is a busy person, and may not be the most technically literate per son—can see at a glance where the problem areas are that need attention, thus avoiding possible information over load (due to the large number of passengers in a busy airport, or a large number of items moving around a distribution centre).

By selecting an agent, the operator can then see a graphical (schematic) display of real-time entity locations within the zones of his/her facility. Problem zones (zones with entities that have active alerts) are highlighted on the graphical display. The operator has the ability to drill into this information either to see the entities underneath the agent, or the entities underneath a selected zone. At this lower level of detail, further traffic lighting could indicate which entities have active alerts. The operator would have the option at this level to filter out entities that are OK (green), so as to focus more easily on the problem entities.

The information the operator is allowed to see may controlled by his/her security profile (e.g. in an airport, an airline duty manager would only see passengers on his or her flights).

Where the agent is looking after a mole complex process, for example, where a sub-task must complete at an earlier time than the main agent, a sub-agent may be used. A sub-agent is a somewhat similar in concept to having a dependent task in a project plan.

For example, in a warehouse if certain cases are being picked and delivered to a pallet building area, and then have to be built into pallets before being shipped, the process of picking and transporting cases to the pallet building area would be a sub-agent. The sub-agent would track the individual cases, and then once they are built into a pallet, the software would remember the association between case and pallet, and then the main agent would track the pallet as it flows to staging and then is loaded at the dock door.

In an airport if wheelchair passengers need to board earlier than main passengers, a sub-agent could be used to track this sub-group of passengers to ensure they are at the departure gate earlier than the rest of the passengers.

Also in an airport, two sub-agents could be used with a flight: the first to track passengers in the normal way, and the second for hold baggage (if the airport uses a baggage tracking system). In this way the duty manager would have a holistic view over the whole flight departure process, from a single, central view.

In the context of an airport environment, it is known that delays and their knock on effects to schedules are a high cost for airlines. After bad weather, congestion in terminals is the next biggest cause of delays. This invention aims to reduce the cost of delays caused by terminal congestion and late passengers, by tracking the movement of passengers through the terminal building, predicting passengers who are at risk of missing their flight, and pro-actively instigating measures to ensure all passengers are at the departure gate on time.

Rather than using simple location-based technology to track the movement of passengers through the airport as a means of reducing delays, the present invention uses knowledge of the passengers' current positions relative to their departure gate, and factors in known delays in the system (e.g. queues to get through the security check, travel between terminals) to predict passengers at risk of missing their flights, allowing airline and airport staff to take appropriate corrective action.

An additional aspect of the invention is that the data gathered about passenger movements can be analysed for other purposes, such as the tracking of unusual behaviour patterns, which may be an indication of terrorist intent.

The system can also be programmed monitor the flow of objects through potential 'bottlenecks' of the airport environment such as the check-in desk, immigration checkpoint and one or more security checkpoints. Tag readers may be used to monitor passage of passengers through these bottleneck zones and provide real-time information about the traffic flow at these zones. For example, queue times may be estimated, and estimated times of arrival of a given object at a departure gate determined. The movement of passengers may be correlated with data related to the flight departure and passenger lists to predict which passengers are at risk of missing their flight. Information relating to the position of the passengers may be made available to airline personnel to enable them to target passengers who are at risk of delaying a flight.

There are a number of further scenarios in which embodiments of the present invention may provide a valuable contribution to the art.

In a manufacturing plant, the invention may be used as part of a system to ensure that supplies (e.g. components, parts, assemblies and sub-assemblies) are available at the tight place and at the right time on the production line, to avoid any stoppages to the line. In this example, the production line and premises would be divided into zones and the items involved in the production process would be tagged. The system would then monitor the progress of the item or items through the zones against an expected schedule, communicating progress to the users of the system.

In the case of a logistics supply chain, the invention may be used as part of a system to ensure that supplies are available at the required place and time, for example in the theatre of a military operation All items (for example clothing, food supplies, hospital supplies, ammunition, etc.) would be tagged and the supply route divided into a series of zones, to track the movement of supplies towards their required destination. The ability to analyse the movement of objects would provide real-time visibility into the supply chain and more importantly would highlight key items that were at risk of not being in the required place at the required time.

In a warehouse used for holding goods for distribution the locating of stock is paramount to the successful operation of the operation. The amount of goods entering and leaving the centre can be a huge burden of the operation of the centre. The distribution centre will be split into designated zones and the system will allow for the location stock be identified to a zone As the goods are moved through the warehouse the position will be tracked and monitored by the system.

The division of areas of an airport or warehouse or other area into zones enables a variety of attributes of zones to be monitored. For example, the number of objects in a given zone could be monitored and if the number exceeded a safe number an alert could be generated. This could include the number of passengers located in a given zone, or the number of flammable goods in a given zone. Similarly, the length of time an object has been located within a given zone or zones could be monitored and if the period exceeded a critical period (for example the period a perishable good is stored) an alert could be generated. Similarly, correlation of storage time with the temperature experienced by the object in the zone could be monitored, either by a temperature sensor of the zone, or a temperature sensor of the tag.

By dividing the warehouse or distribution centre into a series of zones and placing readers between the zones, exactly the same concepts as in the airport can be applied to the supply chain, to provide detailed visibility of inventory movements to warehouse supervisors and give them an early warning system of potential problems.

Zones can be more complex in the case of a warehouse using a conveyor system. By placing RFID readers over certain parts of the conveyor system, the conveyor could be split into a series of zones. Alternatively, in a warehouse that uses a conveyor system with barcoding, where barcode readers are already placed around the system, then these bar-code readers could be used to define zone boundaries and by interfacing to the existing conveyor control system, it would be possible to extract the information needed to track product movements.

In addition, where a site is made up of a number of warehouses, each warehouse could be divided into zones and managed as an entity in its own right, with an aggregated, higher-level view being available for management to see the status of shipments across all warehouses. This concept can also be extended across the supply chain, for example so a retailer can see at a glance the status of shipments within all of its distribution centres and the stockrooms of its stores.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE EMBODIMENTS

In a first embodiment of the invention, in the context of an airport environment, passengers are allocated a 'smart ticket' when they check-in at the airport. The 'smart ticket' is either a special electronic tag printed onto their boarding card, a sticker containing an electronic tag that is attached to a traditional boarding card, or some other tracking device. Each one of these tags contains a unique identifier that can be read by an electronic reader. By associating the unique identifier on the tag to a passenger name record (PNR) from the airline customer reservation system (CRS), it is possible to track individual passengers within the airport.

The object tracking further system comprises a series of readers placed around the airport, to track passenger movement. The readers may be connected to the system via a wireless network. As a passenger with a smart ticket moves past a reader, this triggers an event An event captures information about the reader location (zone), the unique identifier from the passenger's smart ticket, and the date and time of the event.

In a preferred embodiment of the system, the tags and readers use Radio Frequency Identification (RFID) technology. This technology allows for the remote reading of tags (within the supported range of the system) and does not require a line of sight from the tag to the reader to record an event (this allows a 'smart ticket' to be read, even when it is in a customer's jacket pocket or inside his/her hand-luggage). RFID allows for both passive tags to be used and active tags Passive tags are cheaper and therefore disposable, but have less range. Active tags are more expensive, because they also contain a battery to increase reading distances, they could be suitable for low cost airlines that already re-use their boarding cards.

To simplify tracking and location of passengers, the airport is divided into a series of zones. A zone is a 'logical' area of the airport that makes sense to monitor as a discrete entity. The granularity and choice of zone depends on each airport's specific requirements, and how accurately they want to be able to locate passengers. Examples of typical zones are: check-in area, landside shopping area, security screening, passport control, airside lounge, airside shopping area, airside café, airside bar, executive lounge, and each individual departure gate.

Zones are always adjacent to another zone; in other words there is no untracked space between zones where customers can get 'lost' by the system. The readers are located at the entry and exit points between zones to track movement of passengers from one zone into another. This means that readers are always shared between two zones (e.g. check-in area and landside shops). There may be more than one reader at each zone entry/exit point to allow the direction of travel to be identified. As passengers move between zones, this information will be recorded as an event occurrence in the system.

When a passenger checks-in at the airport, an initial event is created, and the system records the fact that the passenger is now in the airport environment, in the check-in area, and the time at which the event occurred is recorded.

The system further comprises a rules engine and an alerts engine. For each flight, the rules engine assesses the probability of passengers being at the gate on time The rules engine may follow the steps of Evaluation, Classification and Action.

During the Evaluation step, on a defined time-schedule (e.g. every minute—this is configurable and can also be set-up to poll more frequently the closer to departure), the system evaluates the current passenger location, the departure time of the flight, and the time it takes to get from the current location to the departure gate (these standard times between zones are configurable by the operator). The system also factors in the time it is currently taking to pass through any bottleneck zones (e.g. security screening) between the current zone and the departure gate.

During the Classification step, based on the probability of passengers arriving at the departure gate on time, they are individually classified into red, amber and green risk categories. The operator can define the probabilities used for these categories.

When a passenger has been classified as a red or amber risk, his/her information is passed to the alerts engine for the final Action stage. For amber risk passengers, the alerts engine can either send out a short message format (SMS) message to the passenger's mobile telephone (where the number is known) advising him/her of the time it will take them to get to the gate, or an alert could be sent to the passenger's personal digital assistant (PDA) using WiFi technology or the like (where applicable), or a public address announcement can be made for that passenger, but only in the zone where he/she is known to be.

For red risk passengers (amber risk passengers may move into this category as the system constantly recalculates risk, especially if they have not reacted to previous alerts), the alerts engine may despatch a customer services agent (CSA) to shepherd the passenger to the gate. The CSA will be equipped with a handheld reader, and a display screen to provide an alert when in the immediate proximity of the red risk passenger. If the passenger moves to a new zone, this information will be relayed immediately to the display screen on the CSA's device. Optionally, the handheld reader can also have a smart tag attached to it, allowing the system to know where the CSAs are, and despatch the neatest CSA to the red risk passenger, to save time.

It is recognised by the inventors that bottleneck zones may exist where passengers must pass through a specific zone to get to their departure gate. Examples of bottleneck zones would include the security screening area and also passport control. The system monitors the 'queue time', for these zones, by tracking the events triggered when each passenger enters the zone and when each passenger leaves the zone, and recording the elapsed time. The system also tracks how many passengers are in the bottleneck zone at a given point in time. By tracking this information, it is possible to estimate the delay time that a passenger will typically incur when passing through this zone and to use this in real-time calculations.

Optionally, airport staff within the bottleneck zone can be provided with access to information about passengers within their zone, and highlighting those at risk of missing their flight. By calling out those passengers' names, or using a hand-held reader to identify them, passengers can be fast-tracked through the bottleneck zone, to prevent them delaying their flight.

Figure 1:
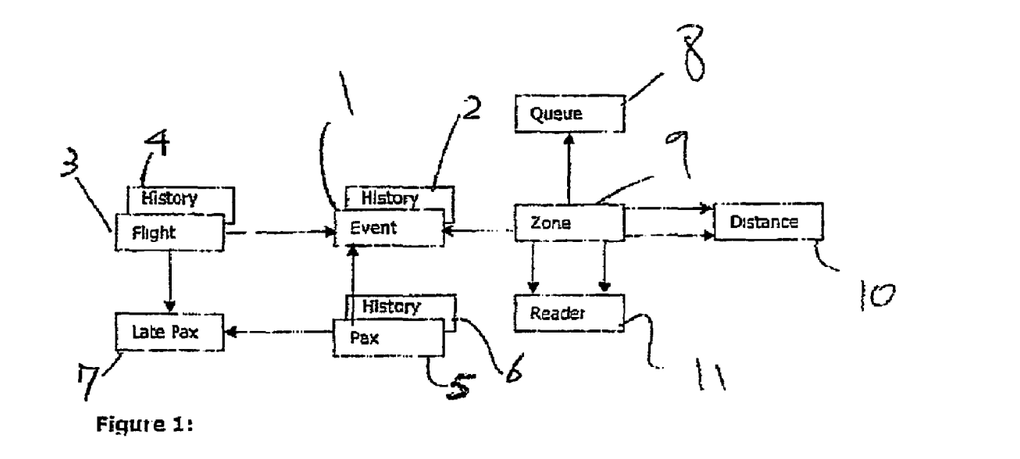
FIG. 1 shows a logical data model using an airport example for a possible embodiment of the invention.

The system implementing the invention according to this embodiment comprises a database having information about passengers, flights, passenger locations (events), bottleneck queues and historical details of passenger movements. FIG. 1 shows a logical data model for the system.

The Event entity 1 holds the last known location of each passenger. It stores the reader group location, the zone the passenger entered, the unique identifier from the passenger's smart ticket, and the date and time of the event. Historical events are archived in History 2 for later analysis purposes Data for the Flight entity 3 is provided through an interface to Departure Control System (DCS—not shown). The Flight entity 3 stores airline, flight number, departure gate, and departure time The flight data is archived in History 4 after flight departure. The flight data is also updated dynamically with messages from the DCS notifying of any changes in departure time, departure gate, or flight cancellation.

Data for the Passenger (Pax) entity 5 is provided through an inter face to the airline Computerised Reservation System (CRS—not shown). The Pax entity 5 stores Passenger Name Record (PNR) data, the unique identifier from the passenger's smart ticket, name, flight number, and mobile telephone number [optional]. The Pax data is archived in History 6 after flight departure.

The Late Pax entity 7 is created when a passenger is identified as being at risk of being late. It stores the passenger identifier, flight number, current risk level, when they were alerted, how they were alerted, and a flag to indicate if they are with a CSA. When a CSA locates a red risk passenger, this updates the Late Pax data, it does not create a new event in the Event entity 1.

The Queue entity 8 holds information for bottleneck zones only. It stores the zone identifier, passenger identifier, time they entered the zone, time they exited the zone (if known yet), time taken to proceed through the zone (if known yet). Data in the Queue entity 8 are automatically deleted after a configurable duration. These records do not need to be archived, because the information can be recreated from the Event History entity 2.

The Zone entity 9 is populated by importing well-specified external data (e.g. XML data) that defines the layout of the airport. The Zone entity 9 contains a description of each zone (including terminal number and satellite number for larger airports), the identity of readers within the zone, some geospatial information positioning the zone relative to other zones (to provide a graphical view of passenger movements), whether the zone is a bottleneck zone, and whether the zone is a departure gate.

Figure 2:
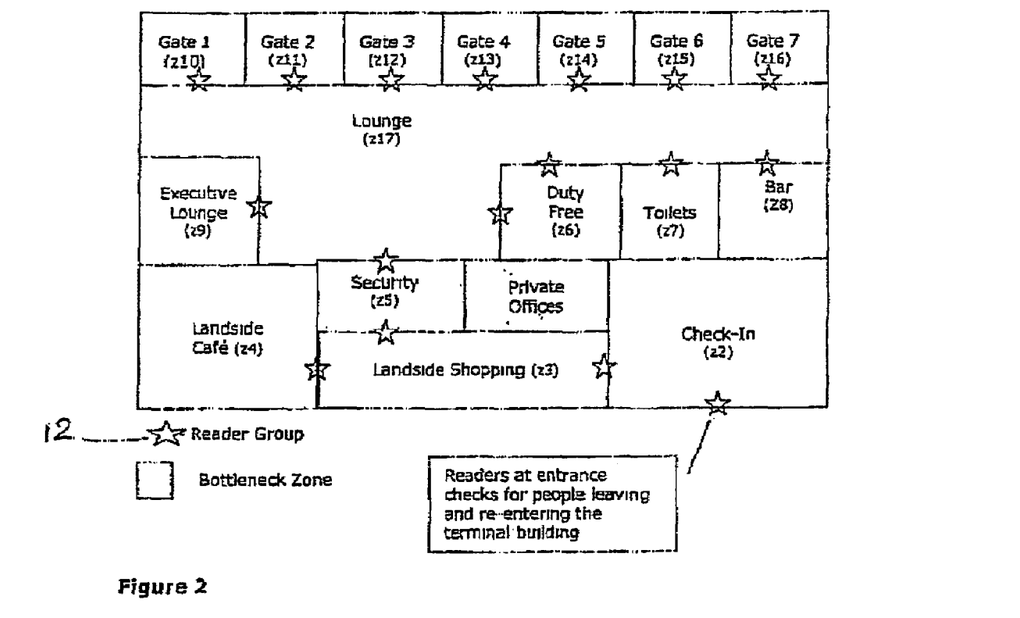
FIG. 2 is a layout of a simple airport, showing zones and reader locations according to one embodiment of the invention.
Figure 3:
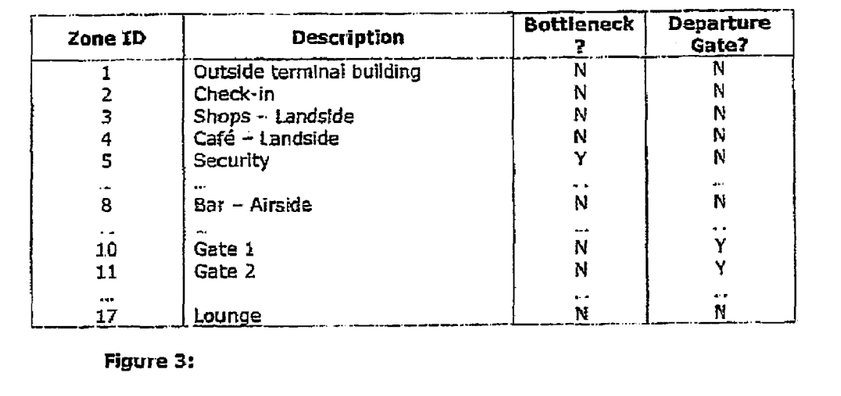
FIG. 3 is a partial example dataset from a possible implementation of a zone database table.

To more easily understand the Zone 9, Distance 10 and Reader 11 entities, consider FIG. 2, which is an example of a small, single terminal airport, with a single bottleneck zone (zone 5), which is the security check zone For this example airport, the key fields in the Zone entity 9 are shown in FIG. 3. Zone ID 1 is a special case, where the passenger is outside the terminal building and therefore cannot be tracked by the system. Where a passenger remains outside the terminal building, and is at risk of missing their flight, their details could be passed to the baggage handlers for early identification of their hold luggage, in case it needs to be removed from the hold of the aeroplane.

Figure 4:
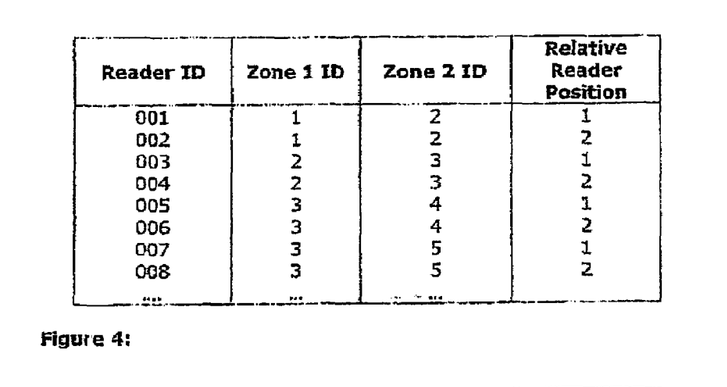
FIG. 4 is a partial example dataset from a possible implementation of a reader database table.

The Reader entity 11 simply stores the ID of the readers 12 and their location in relation to the zones they sit between. For this example, part of the Reader group entity 11 is shown in FIG. 4. In order to identify the direction of travel at zone boundaries there will always be more than one reader 12 at the boundaries, the relative position field will identify the order in which the readers 12 are placed.

The Distances entity 10 defines the estimated standard times taken to travel between zones and will include all combinations of possible movement patterns This information is included within the XML file that defines the zones within the airport and the preferred routes. In order to cope with varying expected durations to travel between zones, for example when terminal shuttle buses run at different frequencies, the Distance entity 10 will link to a calendar entity (not shown) to identify the expected duration at a particular date and time.

Figure 5:
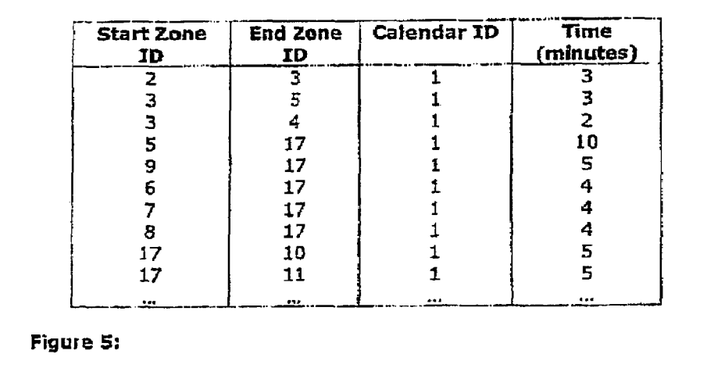
FIG. 5 is a partial example dataset from a possible implementation of a distance database table.

For the present simple airport example, part of the Distances entity 10 is shown schematically in FIG. 5.

The system also comprises a rules engine. The rules engine predicts which passengers are at risk of missing their flight, it is also configurable to monitor the history data for unusual events (e.g. passengers spending too long in one zone, passengers moving into a restricted zone). Where the rules engine detects an exception, it triggers an alert in the alerts engine.

Where the rules engine is watching for unusual events, each airport/airline is able to configure its own rules (in one implementation, this would be using a simple formula language, similar to defining a formula in e.g. Microsoft Excel). For example, one airport may determine that any passenger leaving and re-entering the terminal building more than three times after check-in is exhibiting unusual behaviour. After identifying this fact, the system would then alert security people monitoring CCTV cameras, so they can keep an eye on the passenger and also alert the security screening staff, who may want take a closer look at that person, For the rules engine to determine if a passenger is at risk of missing their flight, it calculates a route for that passenger to their departure gate, using the following process:

Determine passenger current location;
Determine passenger departure gate by looking up their flight details;
Work backwards from the departure gate to the passenger location through the preferred route while noting and aggregating the distances to get from the current location of the passenger to the departure gate.

The zones the passenger needs to pass through can then be checked to see if they are bottleneck zones. For any bottleneck zones the historical queue data for that zone is studied to see what the current time required to pass through this zone is expected to be. If required, additional time will be added to the current aggregated distance calculation for the passenger. The method of calculating any additional required time will be based on the average time taken by passengers who have passed through this zone in the past hour, or any other customisable timeframe.

An example of this process in action, for the example airport, could be for a passenger located in the Airside Bar (zone 8), whose flight is departing from Gate 1 (zone 10) where boarding closes in 30 minutes. The system understands from the loaded airport data that the preferred route for this passenger is:

Airside Bar (zone 8) to the Lounge (zone 17) and then from the Lounge (zone 17) directly to Gate 1 (zone 10).

Looking at FIG. 5, the total journey time can be calculated to be 9 minutes (4 minutes from the Bar (zone 8) to the Lounge (zone 17) and 5 minutes from the Lounge (zone 17) to Gate 1 (zone 10)). Looking at FIG. 3, it can be see that none of the zones 8, 17 or 1 are bottlenecks so no additional time needs adding to the expected journey time. This passenger is not yet at risk of missing the flight as there are 21 spare minutes before boarding closes. However this passenger's progress will continue to be monitored in the time leading up to boarding closing.

A second example for the example airport could be for a passenger in the Landside Café (zone 4), who is departing from Gate 2 (zone 11) where boarding closes in 30 minutes. The preferred route for this passenger is:

Landside Café (zone 4) to Landside Shopping (zone 3), then Landside Shopping (zone 3) to Security (zone 5), then Security (zone 5) to Lounge (zone 17) and then finally Lounge (zone 17) to Gate 2 (zone 11).

Looking at FIG. 5, the total journey time can be calculated to be 20 minutes (2 minutes Landside Café to Landside Shopping, 3 minutes Landside Shopping to Security, 10 minutes Security to Lounge and then finally 5 minutes for Lounge to Gate 2. From FIG. 3 it can be seen that zone 5 (security) is a bottleneck. By querying the Queues entity 8 for zone 5, it is found that the average time to pass through security is 26 minutes so an additional 16 minutes needs adding to the expected duration time. So the total expected duration for this passenger to get to the gate is expected to be 36 minutes. This passenger is not likely to reach the gate in time for boarding and will be flagged as a Red Alert to the air line staff.

The final event recorded by the system is when a passenger leaves the departure gate and boards their flight. By having a handheld (or mobile reader) at the door of the aeroplane, passengers can be counted electronically onto the aeroplane, to ensure that the count matches the flight crew's manual count.

The system may provide a number of outputs for airport/airline staff. The first is a graphical (schematic) display of "real-time" passenger location within the zones of the airport. Passengers may be shown as coloured dots on this display. An operator has the ability to filter the display by flight, by zone, etc. System security may ensure that airline staff can only see their own passengers. The system may also feature a 'playback' mode, where operators can view historical movements, to analyse passenger flow through the airport.

The second of these outputs may be a list, for each flight, of passengers associated with that flight and their last known location, and highlighting passengers at risk of missing the flight. The method of highlighting might be by a colour of text, or an icon associated with a name.

The system keeps a record of the 'history' of the zones a passenger has visited, and has a record of the presently occupied zone based on the location of the readers that have detected the tag. For example, if an object is presently in zone A, and a read is triggered from a reader at the intersection of zones A and B, the system will register that the passenger has moved into zone B. This knowledge of the relationship between a reader and the two related zones A and B is important.

Occasionally a tag may pass by a reader 12 without the read being detected by the system, and uncertainty can subsequently arise as to which zone an object now occupies.

Figure 7:
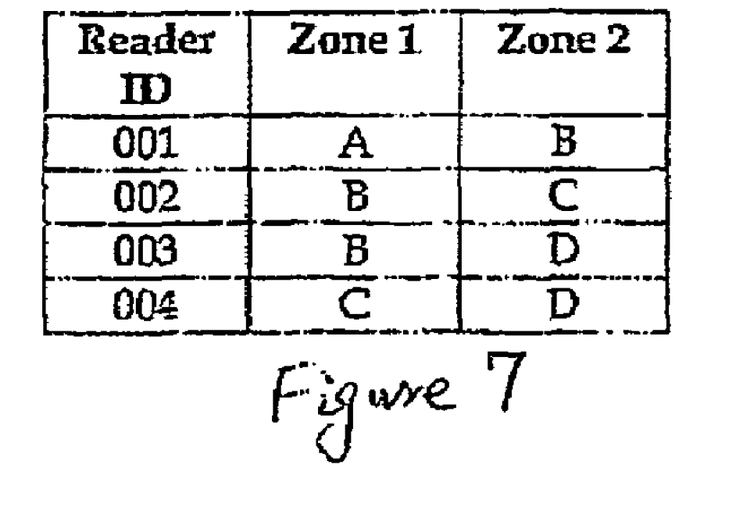
FIG. 7 is a layout summary of a set of readers according to one embodiment of the invention.

For example, with reference to FIG. 7, this summarises a layout in which reader ID 001 is located between zones A and B, reader ID 002 is located between zones B and C, reader ID 003 is located between zones B and D, and reader ID 004 is located between zones C and D. If the system believes a passenger is in zone A and a read is received from reader ID 003, the passenger should be in either zone B or D. The system will therefore identify that a missed read has occurred, and will be able to correct the error.

The system first checks to see if there is an entry in the table (FIG. 7) for zone A which contains zone B or zone D as the second zone. Since reader ID 001 links zones A and B, and this is the only matching record, this is likely to be the missing read. The system can therefore safely assume that the passenger had moved from zone A to zone B (missed read) and is now in zone D.

Figure 6:
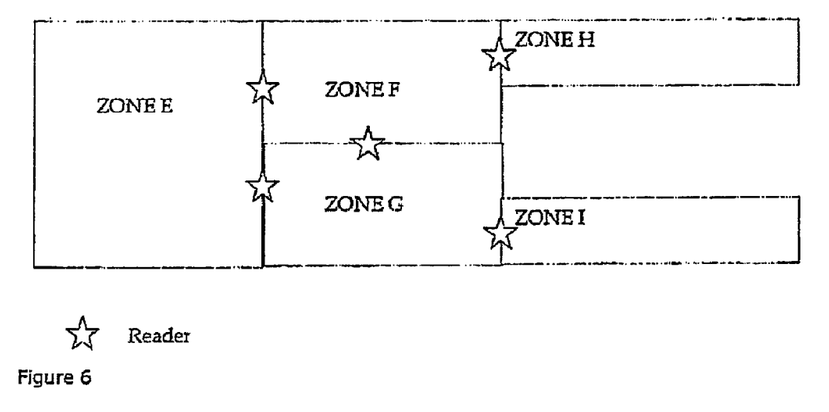
FIG. 6 is a layout of a simple airport, showing zones and read locations according to one embodiment of the invention.
Figure 8:
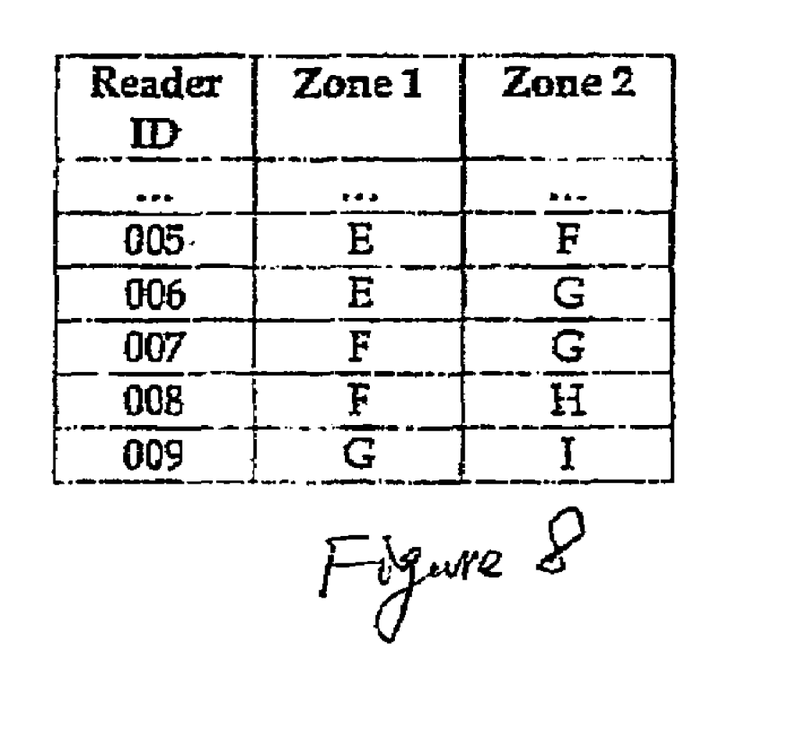
FIG. 8 is another layout summary of a set of readers according to one embodiment of the invention.

The only time this correction will break down is in the situation shown schematically in FIG. 6. With reference to FIG. 8, consider that the system believes the passenger is in zone E. If a 'read' is received from reader ID 007, the passenger should be in either zone F or G. The system assumes a missed read has occurred and looks to correct the error. It first checks to see if there is an entry in the table (FIG. 8) for zone E which contains zone F or zone G as the second zone. It finds that reader ID 005 links zones E and F, and reader ID 006 links zones E and G. Therefore, there is no way of safely knowing which zone the passenger is in. The system therefore logs the location as uncertain, and resolves the location once the next read is received. For example, if a read is received from reader ID 008, the passenger should be in either zone F or H. Since the system knows the passenger was previously in zone F or G, it can safely assume that the passenger was previously in zone F and is now in zone H.

The above example describes in the invention in the context of the airport. The following could be how the airport implementation could be compared to other implementations in warehousing, manufacturing and distribution scenarios. In the airport implementation the process being monitored is the boarding of an aeroplane in time for take off, the entities being tracked are the individual passengers, the zones they move through are particular parts of the airport like the Lounge and the Check in area. An example of a bottleneck area in the airport is passport control where passengers need to queue up to progress to the next part of their journey to the departure gate.

In the manufacturing implementation, the process being monitored could be the manufacture of a car, the entities being tracked would be individual parts or collection of parts that will be used to complete the car. The zones could be parts of the stock storage unit, different parts of the production line and holding zones for partially complete cars. An example bottleneck could be a Quality Control centre or some other area that requires manual involvement.

In a warehouse used for holding goods for distribution, the process being monitored could be the loading of a delivery truck in the planned timeframe. The entities being tracked could be either single items or groups of items, and the zones used could be areas of the warehouse, shelving units and other such holding areas. An example bottleneck could be a Quality Control centre or packaging centre.

In a military logistics example, the process being monitored could be the shipment of supplies to the required location possible across different continents. The entity being tracked would likely to be a collection of items, for example ammunitions, first aid kits and clothing. The zones are likely to be made up of many things, some of which would not be stationary; they might be stores warehouse in the source country, particular areas of the stores warehouse, road transport vehicles, air transport vehicles, water transport vehicles, temporary storage areas and many other areas that would be part of the delivery process. An example bottleneck could be docks or a port in the source country or a temporary storage area.

The preferred features of the invention ate applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

What is claimed is:

1. A system for monitoring the movement of entities from a first location to a second location via a plurality of zones, the system including:
   means for detecting passage of an entity from one zone to another zone;
   data storage means for storing, in real-time, data comprising an identity of each zone a particular entity has occupied, a sequence in which each zone has been occupied, and a time at which the entity moves from one zone to another;
   means for calculating and storing an average transit time of entities through bottleneck zones based on the stored data;
   means for inputting and storing an average transit time of entities through non-bottleneck zones;
   means for calculating, based on the stored data, an estimated completion time of an entity, which is the time to travel between the zone in which an entity is located and the second location of the entity;
   means for calculating, based on said estimated completion time, an estimated time of arrival of an entity at the second location of the entity;
   means for periodically recalculating the estimated completion time of an entity;

and means for providing an alert in the event an entity is predicted to arrive at the second location of the entity beyond a predetermined critical arrival time of the entity.

2. A system as claimed in claim 1, wherein the means for detecting the passage of an entity from one zone to another zone comprises a plurality of tags, at least one tag being carried by each entity, and a plurality of electronic tag readers located between the zones.

3. A system as claimed in claim 2, wherein the tags and electronic tag readers have means for inter-communication via RFID technology.

4. A system as claimed in claim 1, wherein the system further comprises a portable detector, the portable detector having means for inputting the identity of a particular tag to be detected, and means for detecting the presence of that tag within a range of the portable detector.

5. A system as claimed in claim 4, wherein the portable detector further provides a display identifying the zone in which a tag to be located is present based on the stored data, and the estimated distance between the portable detector and the tag, thereby facilitating the location of the passenger carrying that tag.

6. A system as claimed in claim 1, further comprising means for monitoring a predetermined attribute of at least one zone, and means for generating an alert in the event that the predetermined attribute moves beyond a predetermined threshold.

7. A system as claimed in claim 6, wherein the means for monitoring a predetermined attribute is configured to monitor the number of entities within the at least one zone.

8. A system as claimed in claim 6, wherein the means for monitoring a predetermined attribute is configured to monitor a temperature within the at least one zone.

9. A system as claimed in claim 1, further comprising at least one software agent adapted to process and display information relating to a particular subset of entities.

10. A system as claimed in claim 9, further comprising at least one software sub-agent adapted to process and display information relating to a particular subset of the subset of entities.

11. A system as claimed in claim 9, wherein the agent is adapted to provide an indication of which entities in the subset are expected to reach the second location before the predetermined critical arrival time and which entities in the subset are expected to reach the second location after the predetermined critical arrival time.

12. A system as claimed in claim 11, wherein the agent is further adapted to provide an indication of which entities in the subset are expected to reach the second location at or close to the critical arrival time.

13. A system as claimed in claim 1, wherein the entities comprise components of a production line and the zones comprise areas of the production line.

14. A system as claimed in claim 1, wherein the entities comprise supplies of a supply chain and the zones comprise sections of a supply chain.

15. A system as claimed in claim 1, wherein the entities comprise airline passengers and the zones comprise areas of an airport.

16. A system as claimed in claim 15, wherein the system has means for alerting a passenger whose predicted arrival time at the second location is close to or beyond a critical arrival time.

17. A system as claimed in claim 16, wherein said means for alerting a passenger comprises transmitting an alert to a mobile telephone carried by the passenger.

18. A system as claimed in claim 16, wherein said means for alerting a passenger comprises an audible broadcast via an audible broadcast system of the airport.

19. A system as claimed in claim 18, wherein said audible broadcast is confined to the zone in which it is determined, from the stored data, that the passenger is located.

20. A system as claimed in claim 15, further comprising means for displaying the location of passengers in real-time with reference to the stored data.

21. A method for monitoring the movement of entities from a first location to a second location via a plurality of zones, the method including the steps of:
detecting passage of an entity from one zone to another zone;
storing, in real-time, data comprising an identity of each zone a particular entity has occupied, a sequence in which each zone has been occupied, and a time at which the entity moves from one zone to another;
calculating and storing an average transit time of entities through bottleneck zones based on the stored data;
inputting and storing an average transit time of entities through non-bottleneck zones;
calculating, based on the stored data, an estimated completion time of an entity, which is the time to travel between the zone in which an entity is located and the second location of the entity;
calculating, based on said estimated completion time, an estimated time of arrival of an entity at the second location of the entity;
periodically recalculating the estimated completion time of an entity;
and providing an alert in the event an entity is predicted to arrive at the second location of the entity beyond a predetermined critical arrival time of the entity.

22. A method according to claim 21, further comprising the step of monitoring a predetermined attribute of at least one zone, and generating an alert in the event that the predetermined attribute moves beyond a predetermined threshold.

23. A method according to claim 22, wherein the attribute is the number of entities within the at least one zone.

24. A method according to claim 22, wherein the attribute is a temperature within the at least one zone.

25. A method according to claim 21, wherein there is provided at least one software agent that processes and displays information relating to a particular subset of entities.

26. A method according to claim 25, wherein there is provided at least one software sub-agent that processes and displays information relating to a particular subset of the subset of entities.

27. A method according to claim 25, wherein the agent provides an indication of which entities in the subset are expected to reach the second location before the predetermined critical arrival time and which entities in the subset are expected to reach the second location after the predetermined critical arrival time.

28. A method according to claim 27, wherein the agent provides an indication of which entities in the subset are expected to reach the second location at or close to the critical arrival time.

29. A method according to claim 21, wherein the entities comprise components of a production line and the zones comprise areas of the production line.

30. A method according to claim 21, wherein the entities comprise supplies of a supply chain and the zones comprise sections of a supply chain.

31. A method according to claim 21, wherein the entities comprise air line passengers and the zones comprise areas of an airport.

32. A method according to claim 31, further comprising the step of alerting a passenger whose predicted arrival time at the second location is close to or beyond a critical arrival time.

33. A method according to claim 32, wherein an alert is transmitted to a mobile telephone carried by the passenger.

34. A method according to claim 32, wherein an audible broadcast is made via an audible broadcast system of the airport.

35. A method according to claim 34, wherein said audible broadcast is confined to the zone in which it is determined, from the stored data, that the passenger is located.

36. A method according to claim 31, wherein locations of passengers are displayed in real-time with reference to the stored data.

* * * * *